(12) United States Patent
Shinohara (10) Patent No.: US 9,239,825 B2
(45) Date of Patent: Jan. 19, 2016

(54) LIST DISPLAY APPARATUS AND LIST DISPLAY METHOD

(71) Applicant: Alpine Electronics, Inc., Tokyo (JP)

(72) Inventor: Takahiro Shinohara, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 305 days.

(21) Appl. No.: 13/887,666

(22) Filed: May 6, 2013

(65) Prior Publication Data

US 2014/0019120 A1    Jan. 16, 2014

(30) Foreign Application Priority Data

Jul. 12, 2012    (JP) .................................. 2012-156623

(51) Int. Cl.
| | | |
|---|---|---|
| *G06F 17/27* | (2006.01) | |
| *G06F 7/06* | (2006.01) | |
| *G06F 17/22* | (2006.01) | |
| *G06F 7/08* | (2006.01) | |
| *G06F 7/24* | (2006.01) | |
| *G06F 7/36* | (2006.01) | |
| *G06F 17/28* | (2006.01) | |
| *G06F 7/26* | (2006.01) | |

(52) U.S. Cl.
CPC ................ *G06F 17/274* (2013.01); *G06F 7/06* (2013.01); *G06F 17/2223* (2013.01); *G06F 7/08* (2013.01); *G06F 7/24* (2013.01); *G06F 7/26* (2013.01); *G06F 7/36* (2013.01); *G06F 17/2863* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,416,898 | A | * | 5/1995 | Opstad et al. .................. 345/468 |
| 5,799,303 | A | * | 8/1998 | Tsuchimura |
| 6,389,386 | B1 | * | 5/2002 | Hetherington et al. ............ 704/8 |
| 6,460,015 | B1 | * | 10/2002 | Hetherington et al. ............ 704/8 |
| 6,496,844 | B1 | * | 12/2002 | Hetherington et al. ........ 715/236 |
| 7,899,665 | B2 | * | 3/2011 | Davis et al. ........................ 704/8 |
| 2010/0290711 | A1 | * | 11/2010 | Gurcan et al. ................. 382/232 |

FOREIGN PATENT DOCUMENTS

| | | |
|---|---|---|
| EP | 2056219 | 5/2009 |
| JP | 03-210627 | 9/1991 |
| JP | 2011-138281 | 7/2011 |
| WO | WO2008/018287 | 2/2008 |

* cited by examiner

*Primary Examiner* — Richard Zhu
(74) *Attorney, Agent, or Firm* — Brinks Gilson & Lione (57) ABSTRACT

A list display apparatus that displays multiple pieces of character string data in a list on a display unit includes a storage unit that stores the multiple pieces of character string data; a sorting unit that sorts the multiple pieces of character string data stored in the storage unit in a character code order; a ligature decomposing unit that decomposes a ligature included in the multiple pieces of character string data into multiple original letters on which the ligature is based in the sorting by the sorting unit; and a sorting control unit that controls the sorting unit so that the multiple letters resulting from the decomposition by the ligature decomposing unit is used in the sorting, instead of the ligature.

10 Claims, 9 Drawing Sheets

| LIGATURE | | | FIRST LETTER | | SECOND LETTER | |
|---|---|---|---|---|---|---|
| LETTER | DESCRIPTION | CHARACTER CODE | LETTER | CHARACTER CODE | LETTER | CHARACTER CODE |
| ﻵ | INDEPENDENT FORM | U+FEF5 | ل | U+0644 | آ | U+0622 |
| ﻶ | LAST LETTER | U+FEF6 | ل | U+0644 | آ | U+0622 |
| ﻷ | INDEPENDENT FORM | U+FEF7 | ل | U+0644 | أ | U+0623 |
| ﻸ | LAST LETTER | U+FEF8 | ل | U+0644 | أ | U+0623 |
| ﻹ | INDEPENDENT FORM | U+FEF9 | ل | U+0644 | إ | U+0625 |
| ﻺ | LAST LETTER | U+FEFA | ل | U+0644 | إ | U+0625 |
| ﻻ | INDEPENDENT FORM | U+FEFB | ل | U+0644 | ا | U+0627 |
| ﻼ | LAST LETTER | U+FEFC | ل | U+0644 | ا | U+0627 |

PRIOR ART

FIG. 10

| NAME OF LETTER | SINGLE FORM | FIRST LETTER | INTERMEDIATE LETTER | LAST LETTER |
|---|---|---|---|---|
| tā' | ت | تـ | ـتـ | ـت |
| 'ayn | ع | عـ | ـعـ | ـع |

PRIOR ART

FIG. 11

| NAME OF LETTER | LIGATURE | MEANING AND FUNCTION |
|---|---|---|
| lām' alif | لا | ل (lam) + ا (alif) |

PRIOR ART

FIG. 12

| LETTER WITH DIACRTICAL MARK | LETTER TO BE CONVERTED IN SORTING |
|---|---|
| Á | A |
| Ü | U |

LIST DISPLAY APPARATUS AND LIST DISPLAY METHOD

RELATED APPLICATIONS

The present application claims priority to Japanese Patent Application Number 2012-156623, filed Jul. 12, 2012, the entirety of which is hereby incorporated by reference.

BACKGROUND

1. Field of the Invention

The present invention relates to list display apparatuses, list display methods, and list display programs. More particularly, the present invention relates to a list display apparatus, a list display method, and a list display program suitable to display multiple pieces of character string data in a list.

2. Description of the Related Art

Various display devices have hitherto processed characters and letters to be displayed according to Unicode in order to support character systems for the respective languages used over the world.

The characters and letters processed according to the Unicode include Arabic letters. Many of the Arabic letters vary their shapes in accordance with the positions at which the letters are arranged in words (at the beginning, at the end, or at intermediate positions) (refer to FIG. 10). In addition, when specific multiple letters are continuously used in a specific order, the series of multiple letters may be described as a ligature in which the multiple letters are joined to each other (refer to FIG. 11).

Figure 10:
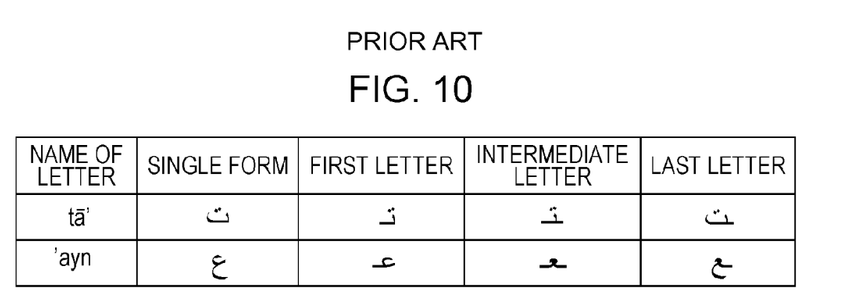
FIG. 10 is a diagram for describing how Arabic letters are varied in shape.
Figure 11:
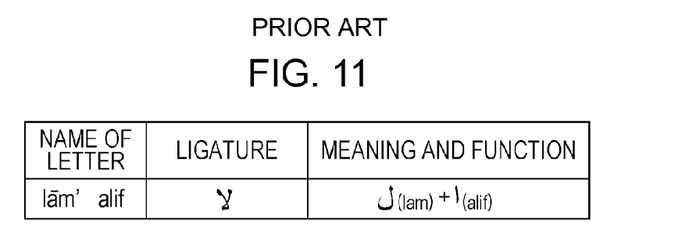
FIG. 11 is a diagram for describing a ligature in the Arabic letters.

For Arabic letters having the above features, the letters before their shapes are varied illustrated in FIG. 10 and the multiple letters (single forms) on which the ligature is based illustrated in FIG. 11 are defined in U+06xx (x is a specific numeric character that is varied depending on the letter) in the Unicode. In contrast, the letters after their shapes are varied illustrated in FIG. 10 (the first letters, the intermediate letters, and the last letters) and the ligature illustrated in FIG. 11 are defined in U+FExx or U+FFxx.

As described above, for Arabic letters, the letters after their shapes are varied and the ligature are processed as the Unicode characters the numbers of which are separated from those of the letters of the single forms.

The various display devices have hitherto sorted the respective pieces of character string data in a certain sort order in order to display lists of the multiple pieces of character string data (for example, refer to Japanese Unexamined Patent Application Publication No. 3-210627).

Figure 12:
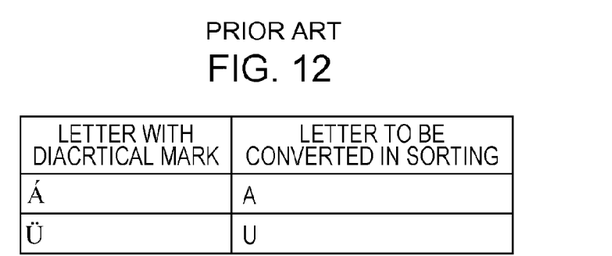
FIG. 12 is a schematic diagram illustrating an example of a sorting method in related art.

In the sorting of English character string data, the character string data is often sorted in alphabetical order, and this sorting order coincides with the order in the Unicode. In the current navigation applications, letters with diacritical marks, such as umlaut, are processed as letters without diacritical marks for the sorting, as illustrated in FIG. 12.

Arabic letters are also often sorted in alphabetical order or according to the Unicode. In some devices, the letters after their shapes are varied illustrated in FIG. 10 are converted into the letters of the single forms for the sorting. For example, refer to Japanese Unexamined Patent Application Publication No. 2011-138281 and International Publication No. WO2008/018287.

However, since the ligature illustrated in FIG. 11 is processed as U+FExx in the Unicode for the ligature in the sorting, the ligature illustrated in FIG. 11 is sorted as a letter separate from the Arabic letters.

Accordingly, in the display of character string data for sorted Arabic letters in the list, it is difficult to find the character string data including the ligature from the list.

SUMMARY

Accordingly, it is an object of embodiments of the present invention to provide a list display apparatus, a list display method, and a list display program capable of sorting pieces of character string data including a ligature in a proper sorting order and capable of simply and rapidly confirming the pieces of character string data including the ligature in a list.

According to an embodiment of the present invention, a list display apparatus that displays multiple pieces of character string data in a list on a display unit includes a storage unit configured to store the multiple pieces of character string data; a sorting unit configured to sort the multiple pieces of character string data stored in the storage unit in a character code order; a ligature decomposing unit configured to decompose a ligature included in the multiple pieces of character string data into multiple original letters on which the ligature is based in the sorting by the sorting unit; and a sorting control unit configured to control the sorting unit so that the multiple letters resulting from the decomposition by the ligature decomposing unit is used in the sorting, instead of the ligature. The multiple pieces of character string data are displayed in the list according to an order of the sorting by the sorting unit under the control of the sorting control unit.

According to another embodiment of the present invention, a list display method for displaying multiple pieces of character string data in a list on a display unit includes a first step of detecting a ligature from the multiple pieces of character string data stored in a storage unit; a second step of decomposing the ligature detected in the first step into multiple original letters on which the ligature is based; a third step of sorting the multiple pieces of character string data in a character code order, the multiple letters resulting from the decomposition in the second step being used in the sorting, instead of the ligature; and a fourth step of displaying the multiple pieces of character string data in the list according to an order of the sorting in the third step.

According to another embodiment of the present invention, a list display program for displaying multiple pieces of character string data in a list on a display unit causes a computer to function as a sorting unit that sorts the multiple pieces of character string data stored in a storage unit in a character code order; a ligature decomposing unit that decomposes a ligature included in the multiple pieces of character string data into multiple original letters on which the ligature is based in the sorting by the sorting unit; a sorting control unit that controls the sorting unit so that the multiple letters resulting from the decomposition by the ligature decomposing unit is used in the sorting, instead of the ligature; and a unit that performs the display of the multiple pieces of character string data in the list according to an order of the sorting by the sorting unit under the control of the sorting control unit.

With the above configuration, when the ligature is included in the pieces of character string data, the ligature is decomposed into the multiple original letters and, instead of the ligature, the letters resulting from the decomposition are used in the sorting according to the character code order. Accordingly, it is possible to prevent the pieces of character string data including the ligature from being sorted into a sorting order which a user does not intend, and to simply and rapidly confirm the pieces of character string data including the ligature in the list.

The list display apparatus may further include a first replacement unit configured to replace a part of the ligature in each piece of character string data including the ligature with all of the multiple letters resulting from the decomposition. The sorting control unit may control the sorting unit so that the pieces of character string data after the replacement by the first replacement unit are used in the sorting, instead of the pieces of character string data including the ligature. Similarly, the list display method may further include a fifth step of replacing a part of the ligature in each piece of character string data including the ligature with all of the multiple letters resulting from the decomposition. The third step may use the pieces of character string data after the replacement in the fifth step in the sorting, instead of the pieces of character string data including the ligature.

With the above configuration, it is possible to more properly perform the sorting of the pieces of character string data including the ligature in consideration of the sorting order including other pieces of character string data that include no ligature but includes the first letter in the multiple original letters of the ligature at the same position as that of the ligature.

The list display apparatus may further include a second replacement unit configured to replace a part of the ligature in each piece of character string data including the ligature with only a first letter of the multiple letters resulting from the decomposition. The sorting control unit may control the sorting unit so that the pieces of character string data after the replacement by the second replacement unit are used in the sorting, instead of the pieces of character string data including the ligature. Similarly, the list display method may further include a sixth step of replacing a part of the ligature in each piece of character string data including the ligature with only a first letter of the multiple letters resulting from the decomposition. The third step may use the pieces of character string data after the replacement in the sixth step in the sorting, instead of the pieces of character string data including the ligature.

With the above configuration, since the number of the letters in the pieces of character string data including the ligature is prevented from being increased due to the decomposition of the ligature, it is possible to reduce the necessary memory capacity.

The list display apparatus may further include a third replacement unit configured to replace a part of the ligature in each piece of character string data including the ligature with all of the multiple letters resulting from the decomposition or only a first letter of the multiple letters resulting from the decomposition. The sorting control unit may control the sorting unit so that the pieces of character string data after the replacement by the third replacement unit are used in the sorting, instead of the pieces of character string data including the ligature. Similarly, the list display method may further include a seventh step of replacing a part of the ligature in each piece of character string data including the ligature with all of the multiple letters resulting from the decomposition or only a first letter of the multiple letters resulting from the decomposition. The third step may use the pieces of character string data after the replacement in the seventh step in the sorting, instead of the pieces of character string data including the ligature.

With the above configuration, it is possible to properly perform the sorting of the pieces of character string data including the ligature in consideration of the sorting order including other pieces of character string data that include the first letter in the multiple original letters of the ligature or to prevent the number of the letters from being increased due to the decomposition of the ligature to perform the sorting in a state in which the memory capacity is conserved. Consequently, the degree of freedom in design is improved.

In the list display apparatus, the third replacement unit may determine whether the part of the ligature is replaced with all of the multiple letters or only the first letter of the multiple letters depending on a type of the list to be displayed, to which the pieces of character string data including the ligature belong. Similarly, in the list display method, the seventh step may include determining whether the part of the ligature is replaced with all of the multiple letters or only the first letter of the multiple letters depending on a type of the list to be displayed, to which the pieces of character string data including the ligature belong; and performing the replacement in accordance with a result of the determination.

With the above configuration, it is possible to select a mode of the sorting depending on the type of the list to be displayed.

In the list display apparatus, the pieces of character string data including the ligature may be displayed in the list in a display mode in which the ligature is included. Similarly, in the list display method, the fourth step may display the pieces of character string data including the ligature in the list in a display mode in which the ligature is included.

With the above configuration, since the multiple original letters resulting from the decomposition of the ligature are used only for the sorting, it is possible to display the list in which the pieces of character string data including the ligature are properly reflected.

In the list display apparatus, the multiple pieces of character string data may include data read from an external device.

With the above configuration, since the scope to which the proper sorting of the pieces of character string data including the ligature is applied is expanded, it is possible to improve the versatility.

In the list display apparatus, the multiple pieces of character string data may include data searched for from a database under a certain search condition.

With the above configuration, when the list display apparatus is applied to a search apparatus, it is possible to simply and rapidly confirm the pieces of character string data including the ligature in the result of the search in the list.

In the list display apparatus, the multiple pieces of character string data may include pieces of character string data in Arabic.

With the above configuration, it is possible to sort the pieces of character string data in Arabic in a proper sorting order.

In the list display apparatus, the ligature decomposing unit may decompose a ligature in the Arabic letters into multiple original letters regardless of whether the ligature in the Arabic letters is used in an independent form or as a last letter.

With the above configuration, it is possible to sort the pieces of character string data in Arabic in a more proper sorting order.

In the list display apparatus, the ligature decomposing unit may decompose the ligature on the basis of a table in which a correspondence between the ligature and the multiple original letters is described.

With the above configuration, it is possible to rapidly and efficiently perform the proper sorting of the pieces of character string data including the ligature.

According to embodiments of the present invention, it is possible to sort the pieces of character string data including the ligature in a proper sorting order and to simply and rapidly confirm the pieces of character string data including the ligature in the list.

DETAILED DESCRIPTION OF THE PREFERRED EMBODIMENTS

First Embodiment

List Display Apparatus and List Display Program

A list display apparatus and a list display program according to a first embodiment of the present invention will herein be described with reference to FIGS. 1 to 4.

Figure 1:
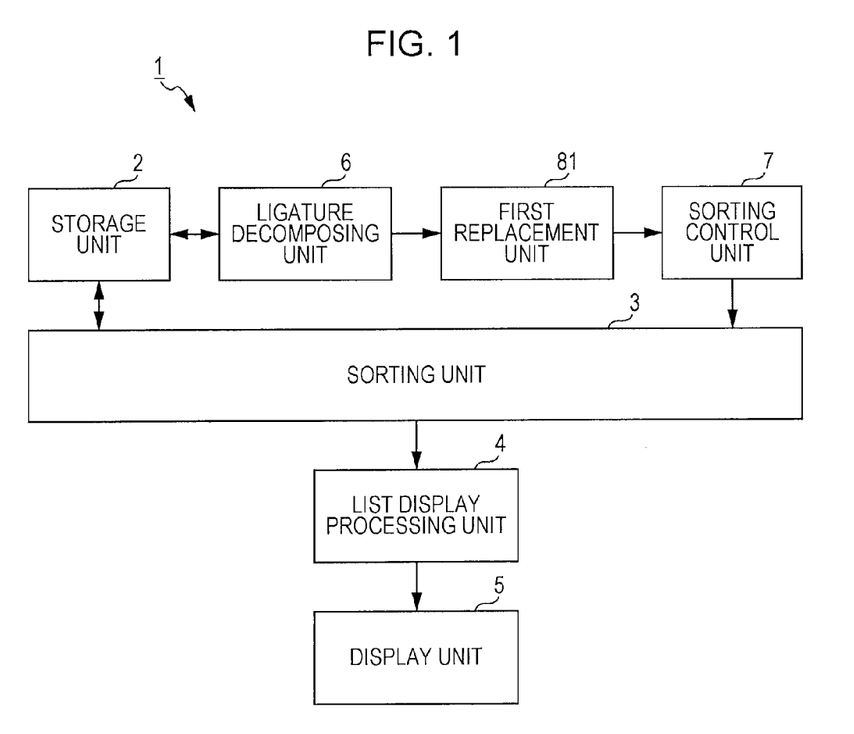
FIG. 1 is a block diagram illustrating an example of the configuration of a list display apparatus and an example of a list display program in a first embodiment of the present invention.

FIG. 1 is a block diagram illustrating an example of the configuration of a list display apparatus 1 in the first embodiment. The list display apparatus 1 in the first embodiment may be used with various devices including an in-vehicle device, a mobile phone, or a personal computer (PC).

Referring to FIG. 1, the list display apparatus 1 in the first embodiment includes a storage unit 2. Multiple pieces of character string data are stored in the storage unit 2.

The multiple pieces of character string data may be stored in the storage unit 2 with pieces of content to be displayed in a list in a state in which the multiple pieces of character string data are associated with the pieces of content and may represent the attributes of the pieces of content. Such pieces of character string data include pieces of character string data representing the names, the artist names, etc. of tunes associated with music data (an audio file), which is an exemplary piece of content.

Alternatively, the multiple pieces of character string data may be stored in the storage unit 2 with pieces of content that have been searched for from a database under a certain search condition in a state in which the multiple pieces of character string data are associated with the pieces of content and may represent the attributes of the pieces of content. However, the database in this case is not limited to the one in a device with which the list display apparatus 1 is used and may be a cloud database. The search for the pieces of content may not be limited to a search performed by the device with which the list display apparatus 1 is used and a server on the cloud may perform the search for the pieces of content. When the cloud is used, a device having a function (communication module) to connect to an external network (for example, the Internet) may be adopted as the device with which the list display apparatus 1 is used. Such pieces of character string data associated with a search result include pieces of character string data representing the names of facilities associated with facility data (an exemplary piece of content) that has been searched from a map database by a facility search in a navigation application.

Alternatively, the multiple pieces of character string data may represent the names and the telephone numbers of persons associated with telephone numbers registered in a telephone book in a hands-free calling function.

The storage unit 2 may be realized by any of various storage apparatuses including a built-in memory, a flash memory, a secure digital (SD) memory card, and a hard disk drive.

Referring to FIG. 1, the list display apparatus 1 also includes a sorting unit 3. The sorting unit 3 sorts the multiple pieces of character string data stored in the storage unit 2 (that is, the pieces of content) in a character code order. Specifically, in the sorting, the sorting unit 3 determines a rank in the sorting order of the first letter in each piece of character string data in accordance with the character code order to sort the piece of character string data including the first letter to which priority is to be given at a sorting position toward the beginning (in other words, to sort the piece of character string data including the first letter to which priority is not given at a later sorting position). Then, the sorting unit 3 sequentially repeats such processing for the second and subsequent letters in each piece of character string data, proceeding toward the letters at the end until the sorting order is determined. The character code may be the Unicode. In addition, various modes may be used as triggers of the sorting by the sorting unit 3. For example, an instruction to display a list to the list display apparatus 1 by a user's operation using various input interfaces or acquisition of pieces of character string data in the storage unit 2 with pieces of content corresponding to the pieces of character string data may be used as the triggers of the sorting by the sorting unit 3. Furthermore, the sorting unit 3 may embody programs to realize the function of the sorting unit 3 by an arithmetic processing unit (a computer), such as a central processing unit (CPU), that executes the programs. In this case, the programs may be stored in a program storage unit, such as a read only memory (ROM), and the result of the processing in the arithmetic processing unit may be temporarily stored in a storage unit, such as a random access memory (RAM).

Referring to FIG. 1, the list display apparatus 1 further includes a list display processing unit 4. The list display processing unit 4 displays the multiple pieces of character string data in a list in a display unit 5, such as a display, in accordance with the sorting order by the sorting unit 3. Specifically, the list display processing unit 4 displays the pieces of character string data having higher ranks (toward the beginning) in the sorting order by the sorting unit 3 toward the beginning of the list and displays the pieces of character string data having lower ranks in the sorting order by the sorting unit 3 toward the end of the list. The list display processing unit 4 may display a list item composed of each piece of character string data in a state in which the list item is selectable by the input interfaces. In this case, the device with which the list display apparatus 1 is used performs processing corresponding to the selected list item. For example, when the selected list item is the name of a tune, the device with which the list display apparatus 1 is used (a function as an audio apparatus) may play back the music data about the name of the tune. When the selected list item is the name of a facility, the device with which the list display apparatus 1 is used (a function as a navigation apparatus) may set the facility as a destination or a position on the route in the navigation. When the selected list item is the name and the telephone number of a person registered in a telephone book, the device with which the list display apparatus 1 is used (a function as a hands-free calling apparatus) may call the number. The list display processing unit 4 may embody programs to realize the function of the list display processing unit 4 by the arithmetic processing unit that executes the programs.

Figure 2:
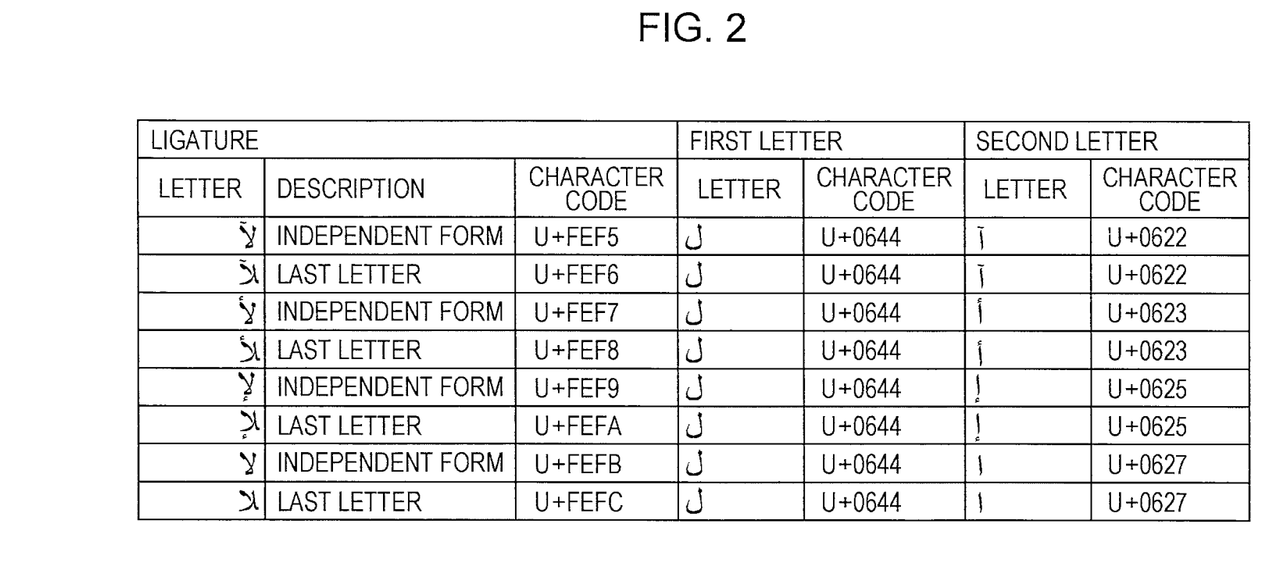
FIG. 2 is a conceptual diagram illustrating an example of table data used in decomposition of ligatures by a ligature decomposing unit in the list display apparatus in FIG. 1.

Referring to FIG. 1, the list display apparatus 1 further includes a ligature decomposing unit 6. If a ligature is included in any of the multiple pieces of character string data to be sorted in the sorting by the sorting unit 3, the ligature decomposing unit 6 decomposes the ligature into multiple original letters (a series of letters) on which the ligature is based. The processing in the ligature decomposing unit 6 may be based on a table in which the correspondence between ligatures and the multiple original letters (the correspondence between the ligatures and the character codes) is described, as illustrated in FIG. 2. The ligature decomposing unit 6 may embody programs to realize the function of the ligature decomposing unit 6 by the arithmetic processing unit that executes the programs.

Referring to FIG. 1, the list display apparatus 1 further includes a sorting control unit 7. The sorting control unit 7 controls the sorting unit 3 so that the multiple letters decomposed by the ligature decomposing unit 6 are used in the sorting, instead of the ligature. The sorting control unit 7 may embody programs to realize the function of the sorting control unit 7 by the arithmetic processing unit that executes the programs.

Referring to FIG. 1, the list display apparatus 1 further includes a first replacement unit 81 as a more specific component used for the control by the sorting control unit 7. The first replacement unit 81 replaces the part of the ligature in each piece of character string data including the ligature with all of the multiple original letters resulting from the decomposition by the ligature decomposing unit 6 and holds (stores) the pieces of character string data after the replacement as sorting character string data for the pieces of character string data including the ligature in a state in which the pieces of character string data after the replacement are associated with the pieces of character string data including the ligature. The pieces of character string data including the ligature are not lost even after the replacement. The first replacement unit 81 may embody programs to realize the function of the first replacement unit 81 by the arithmetic processing unit that executes the programs.

In the present embodiment, the sorting control unit 7 controls the sorting unit 3 so that the pieces of character string data after the replacement by the first replacement unit 81 are used in the sorting, instead of the pieces of character string data including the ligature.

Under the above control, the sorting unit 3 performs the sorting by using the pieces of character string data after the replacement by the first replacement unit 81, instead of the pieces of character string data including the ligature. In other words, in the present embodiment, the display of the multiple pieces of character string data in the list is performed in the sorting order by the sorting unit 3 under the control of the sorting control unit 7.

With the above configuration, when the ligature is included in the pieces of character string data, the ligature is decomposed into the multiple original letters and the letters resulting from the decomposition are used in the sorting according to the sorting order, instead of the ligature. Accordingly, it is possible to prevent the pieces of character string data including the ligature from being sorted at a sorting position which a user does not intend, to simply and rapidly confirm the pieces of character string data including the ligature in the list. In addition, it is possible to more properly perform the sorting of the pieces of character string data including the ligature in consideration of the sorting order including other pieces of character string data that include no ligature but include the first letter in the multiple original letters of the ligature at the same position as that of the ligature.

In addition to the above configuration, in the present embodiment, the list display processing unit 4 displays the pieces of character string data including the ligature in the list in a display mode in which the ligature is included.

Since the multiple original letters resulting from the decomposition of the ligature are used only for the sorting in the above configuration, it is possible to display the list in which the pieces of character string data including the ligature are properly reflected.

Figure 3:
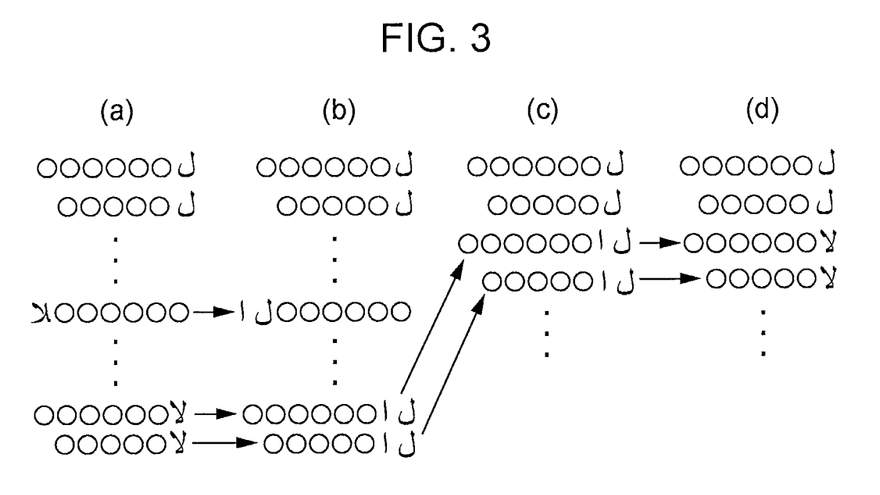
FIG. 3 includes diagrams indicating an example of how the list display apparatus in FIG. 1 operates.

FIG. 3 includes diagrams indicating an example of how the list display apparatus 1 in the first embodiment operates. How the state of arrangement of pieces of character string data is varied is illustrated in FIG. 3.

FIG. 3(*a*) illustrates pieces of character string data in Arabic as the multiple pieces of character string data before the sorting by the sorting unit 3. In FIG. 3, letters other than ligatures "lam alif" and a single form "lam" in the pieces of character string data are simply indicated by circles for convenience. The multiple pieces of character string data in the stage in FIG. 3(*a*) may be arranged in various arrangement orders, such as a reading order into the storage unit 2. However, the sorting in the present embodiment has not been performed regardless of which order is adopted.

Next, the decomposition of the ligatures by the ligature decomposing unit 6 and the replacement by the first replacement unit 81 are performed for the pieces of character string data including the ligatures "lam alif" in FIG. 3(*a*) to generate the sorting character string data illustrated in FIG. 3(*b*). As illustrated in FIG. 3(*b*), the ligatures "lam alif" included in FIG. 3(*a*) are replaced with the two original letters "lam+alif" regardless of whether the ligature "lam alif" is used in the independent form or as the last letter and regardless of where the ligatures "lam alif" are arranged. In contrast, the pieces of character string data that include no ligature are not varied from the state in FIG. 3(*a*).

Next, the sorting is performed by using the pieces of character string data in FIG. 3(*b*) according to the character code order by the sorting unit 3 to produce a result of sorting illustrated in FIG. 3(*c*). As illustrated in FIG. 3(*c*), in the case of the pieces of character string data the first letter of which is the ligature "lam alif" and which are arranged apart from the pieces of character string data the first letter of which is the single form "lam" in the stage in FIG. 3(*a*), the first letter is replaced with the two original letters "lam+alif" for the sorting. As a result, the above pieces of character string data are arranged near the pieces of character string data the first letter of which is the single form "lam".

Next, the pieces of character string data are displayed in the list by the list display processing unit 4 according to the sorting order of the pieces of character string data illustrated in FIG. 3(c) to produce a result of display illustrated in FIG. 3(d).

The user is capable of rapidly confirming the pieces of character string data including the ligature "lam alif" near the pieces of character string data including the single form "lam."

Various modifications may be applied to the present invention, in addition to the above ones.

Figure 4:
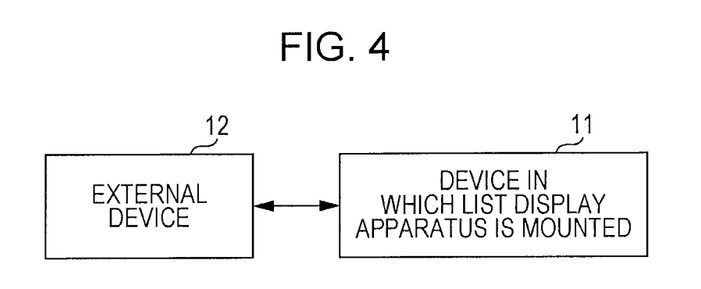
FIG. 4 is a block diagram illustrating an exemplary modification of the list display apparatus in FIG. 1.

For example, the multiple pieces of character string data may be read into the storage unit 2 from an external device 12 connected to a device 11 with which the list display apparatus 1 is used, as illustrated in FIG. 4. Specific examples in this case include reading of name-and-telephone-number-of-person data (character string data) registered in a telephone book from a mobile phone (the external device 12) connected to an in-vehicle device with telephone book data in the in-vehicle device (the device 11) and reading of tune name data (character string data) from a portable media player (the external device 12) connected to an in-vehicle device with music data in the in-vehicle device (the device 11).

List Display Method

Figure 5:
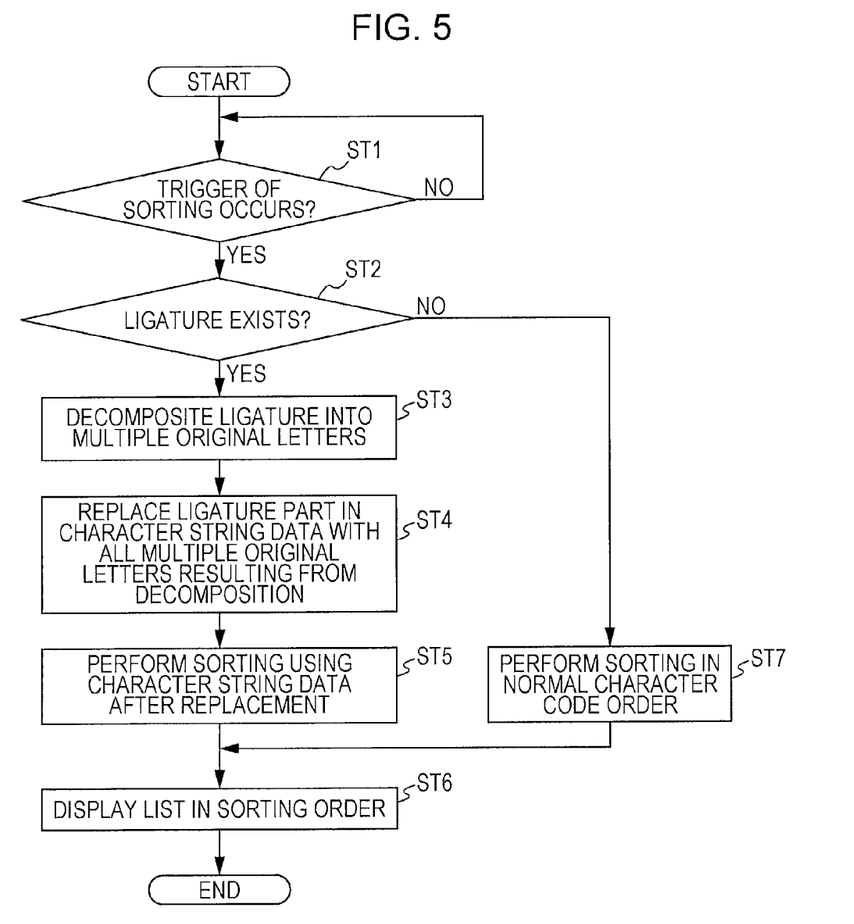
FIG. 5 is a flowchart illustrating an exemplary process of a list display method in the first embodiment of the present invention.

FIG. 5 illustrates an exemplary process of a list display method in the first embodiment of the present invention, to which the list display apparatus 1 described above is applied.

Referring to FIG. 5, in Step ST1, the sorting control unit 7 determines whether any trigger of the sorting occurs. If the determination in Step ST1 is affirmative, the process goes to Step ST2. If the determination in Step ST1 is negative, the process repeats Step ST1.

In Step ST2, the sorting control unit 7 determines whether any ligature exists in the multiple pieces of character string data stored in the storage unit 2. The determination in Step ST2 may be based on the presence of the character codes corresponding to known ligatures. If the determination in Step ST2 is affirmative, the process goes to Step ST3. If the determination in Step ST2 is negative, the process goes to Step ST7.

In Step ST3, the ligature decomposing unit 6 decomposes the ligature detected in Step ST2 into multiple original letters.

In Step ST4, the first replacement unit 81 replaces the ligature part in the pieces of character string data including the ligature detected in Step ST2 with all of the multiple original letters resulting from the decomposition in Step ST3.

In Step ST5, the sorting unit 3 performs the sorting in the character code order by using the pieces of character string data replaced in Step ST4, instead of the pieces of character string data including the ligature detected in Step ST2, under the control of the sorting control unit 7.

In Step ST6, the list display processing unit 4 displays the multiple pieces of character string data in a list according to the sorting order by the sorting unit 3. Then, the process is terminated.

In Step ST7, the sorting unit 3 performs the sorting according to the normal character code order. Then, the process goes to Step ST6.

Second Embodiment

A second embodiment of the present invention will now be described with reference to FIGS. 6 to 8, with a focus on a difference from the first embodiment.

Figure 6:
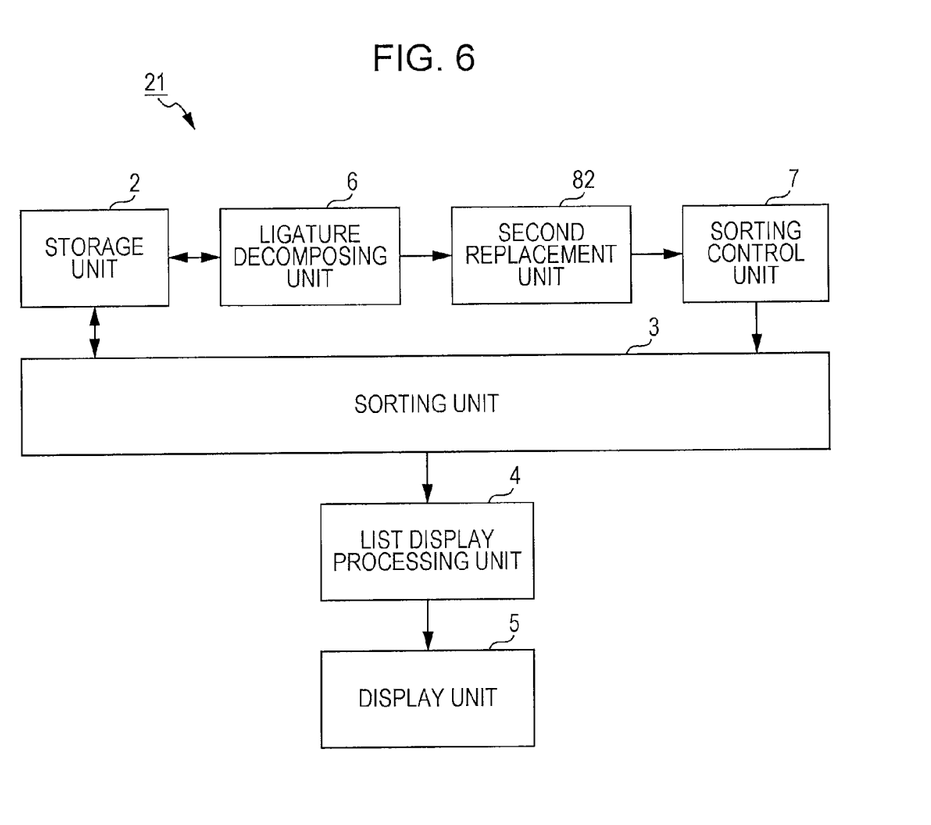
FIG. 6 is a block diagram illustrating an example of the configuration of a list display apparatus in a second embodiment of the present invention.

FIG. 6 is a block diagram illustrating an example of the configuration of a list display apparatus 21 in the second embodiment. The list display apparatus 21 in the second embodiment differs from the list display apparatus 1 in the first embodiment in that the list display apparatus 21 includes a second replacement unit 82, instead of the first replacement unit 81.

The second replacement unit 82 replaces the part of the ligature in each piece of character string data including the ligature with only the first letter of the multiple original letters resulting from the decomposition by the ligature decomposing unit 6 and holds the pieces of character string data after the replacement as the sorting character string data for the pieces of character string data including the ligature in the state in which the pieces of character string data after the replacement are associated with the pieces of character string data including the ligature.

Figure 7:
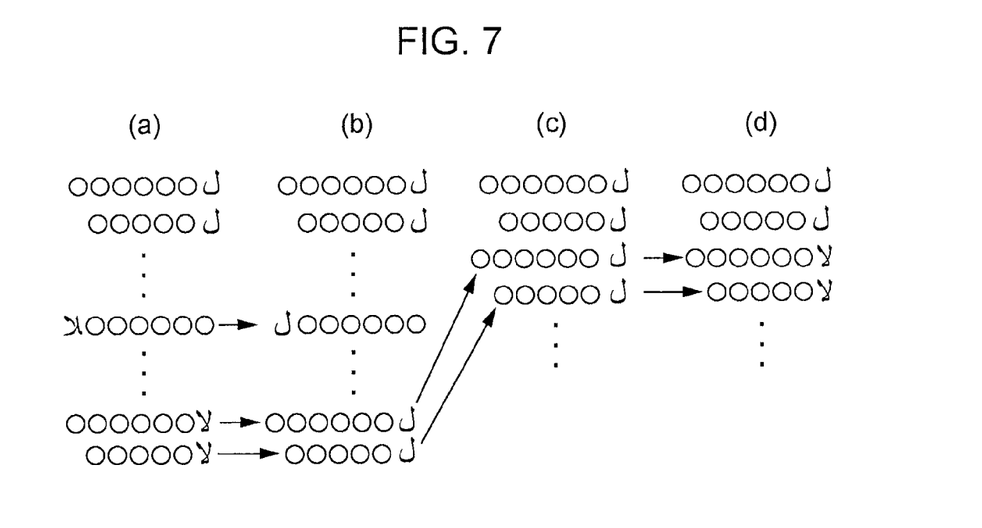
FIG. 7 includes diagrams indicating an example of how the list display apparatus in FIG. 6 operates.

Accordingly, in the same case as that in the first embodiment illustrated in FIG. 3, the sorting character string data for the pieces of character string data including the ligature "lam alif" illustrated in FIG. 7(b) is produced in the second embodiment. In the sorting character string data in FIG. 7(b), the part of the ligature "lam alif" is replaced with only the single form "lam."

Figure 8:
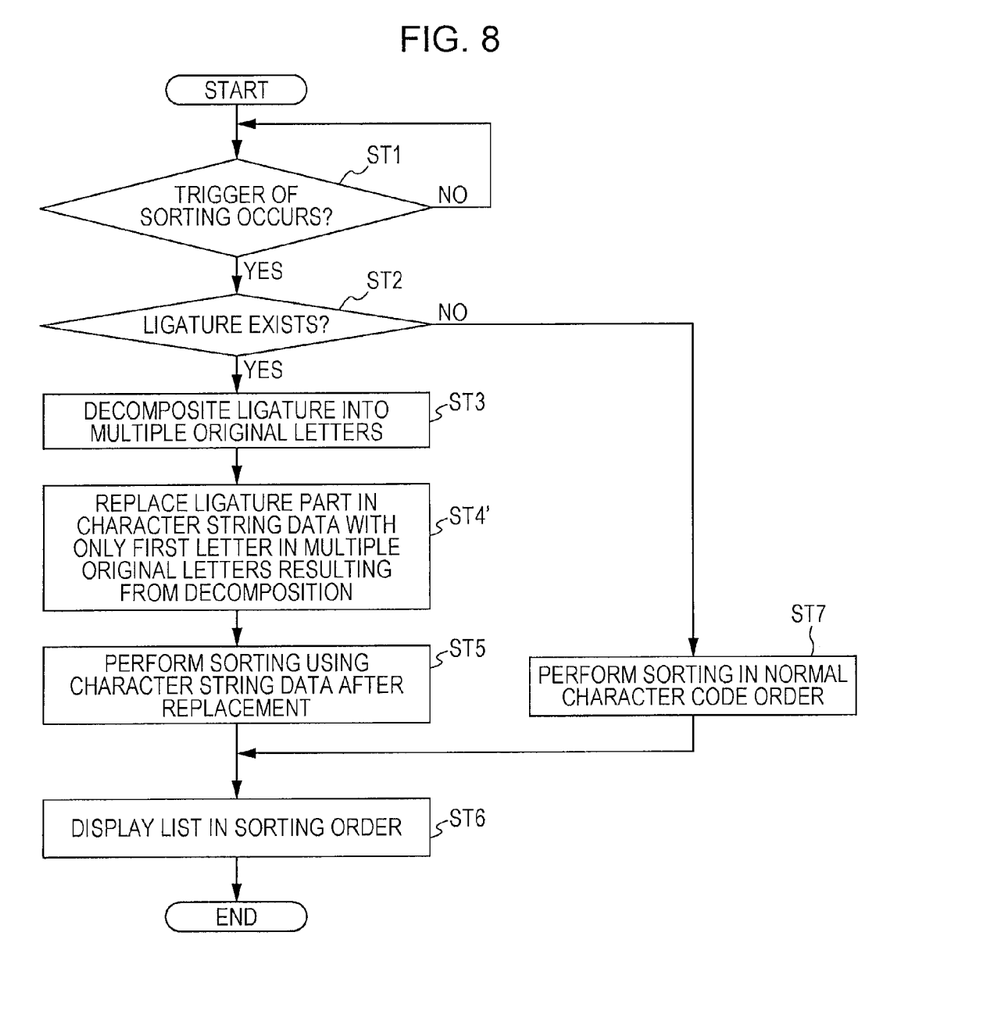
FIG. 8 is a flowchart illustrating an exemplary process of a list display method in the second embodiment of the present invention.

Similarly, in a list display method in the second embodiment, Step ST4' corresponding to the operation of the second replacement unit 82 is executed, instead of Step ST4 in the first embodiment illustrated in FIG. 5, as illustrated in FIG. 8.

According to the second embodiment, the number of the letters after replacement (the number of letters the ranks of which in the sorting order based on the character code are to be determined) in the pieces of character string data including the ligature is prevented from being increased due to the decomposition of the ligature. Accordingly, it is possible to reduce the necessary memory capacity (load).

While the invention is described in terms of some specific examples and embodiments, it will be clear that this invention is not limited to these specific examples and embodiments and that many changes and modifications may be made without departing from the spirit and scope of the invention.

Figure 9:
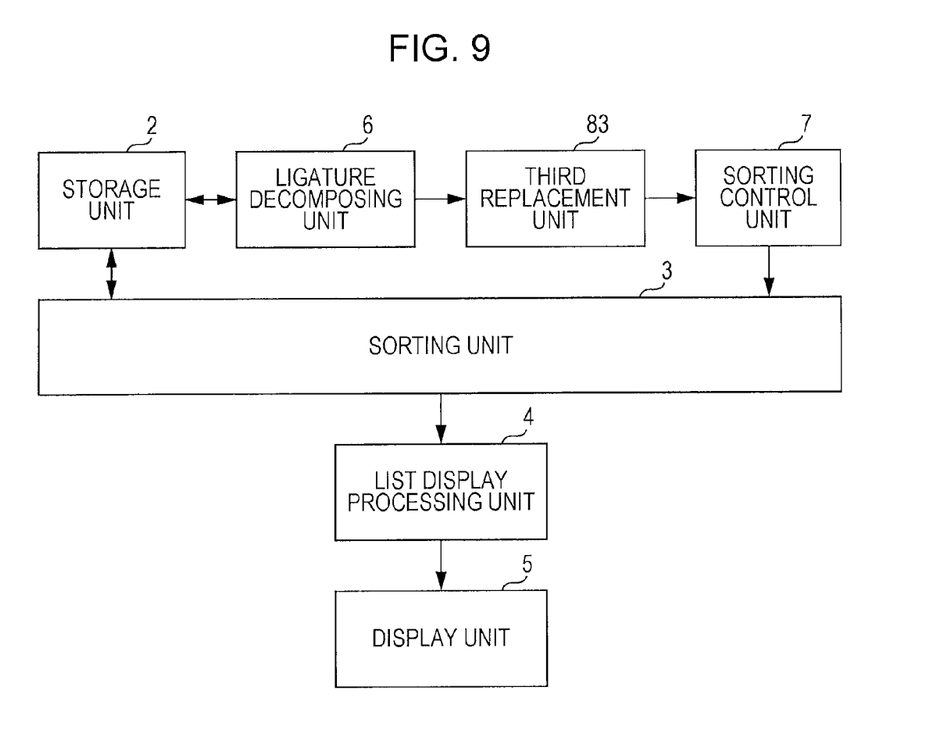
FIG. 9 is a block diagram illustrating an example of the configuration of a list display apparatus in another embodiment of the present invention.

For example, as illustrated in FIG. 9, a third replacement unit 83 may be provided, instead of the first replacement unit 81 and the second replacement unit 82. The third replacement unit 83 replaces the part of the ligature in each piece of character string data including the ligature with all of the multiple original letters resulting from the decomposition by the ligature decomposing unit 6 or only the first letter of the multiple original letters resulting from the decomposition by the ligature decomposing unit 6 and holds the pieces of character string data after the replacement as the sorting character string data for the pieces of character string data including the ligature in the state in which the pieces of character string data after the replacement are associated with the pieces of character string data including the ligature.

The third replacement unit 83 may determine whether the part of the ligature is replaced with all of the multiple original letters or only the first letter of the multiple original letters on the basis of the type of the list to be displayed, to which the pieces of character string data including the ligature belong. Specifically, for example, the part of the ligature may be replaced with all of the multiple original letters in the case of facility name data, which is an example of the list to be displayed, and the part of the ligature may be replaced with only the first letter in the multiple original letters in the case of tune name data, which is another example of the list to be displayed.

Alternatively, the third replacement unit 83 may vary the method of replacing the part of the ligature depending on the number of the pieces of character string data even with the same type of the list to be displayed. Specifically, for example, the part of the ligature may be replaced with only the first letter in the multiple original letters if the number of the pieces of character string data is greater than or equal to a certain value and the part of the ligature may be replaced with all of the multiple original letters if the number of the pieces of character string data is smaller than the certain value.

The present invention may be applied to the letters or characters in a language other than Arabic as long as the language includes the concept of the decomposition of each ligature into multiple original letters.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A list display apparatus that displays multiple pieces of character string data in a list on a display unit, the list display apparatus comprising:
    a storage unit configured to store the multiple pieces of character string data;
    a sorting unit configured to sort the multiple pieces of character string data stored in the storage unit in a character code order;
    a ligature decomposing unit configured to decompose a ligature included in the multiple pieces of character string data into multiple original letters on which the ligature is based in the sorting by the sorting unit;
    a replacement unit configured to replace a part of the ligature in each piece of character string data including the ligature with only a first letter of the multiple letters resulting from the decomposition; and
    a sorting control unit configured to control the sorting unit so that the pieces of character string data after the replacement by the replacement unit are used in the sorting, instead of the pieces of character string data including the ligature,
    wherein the multiple pieces of character string data are displayed in the list according to an order of the sorting by the sorting unit under the control of the sorting control unit.

2. The list display apparatus according to claim 1,
    wherein the pieces of character string data including the ligature are displayed in the list in a display mode in which the ligature is included.

3. The list display apparatus according to claim 1,
    wherein the multiple pieces of character string data include data read from an external device.

4. The list display apparatus according to claim 1,
    wherein the multiple pieces of character string data include data searched for from a database under a certain search condition.

5. The list display apparatus according to claim 1,
    wherein the multiple pieces of character string data include pieces of character string data in Arabic.

6. The list display apparatus according to claim 5,
    wherein the ligature decomposing unit decomposes a ligature in Arabic letters into multiple original letters regardless of whether the ligature in Arabic letters is used in an independent form or as a last letter.

7. The list display apparatus according to claim 5,
    wherein the ligature decomposing unit decomposes the ligature on the basis of a table in which a correspondence between the ligature and the multiple original letters is described.

8. A list display method that displays multiple pieces of character string data in a list on a display unit, the list display method comprising:
    a first step of detecting a ligature from the multiple pieces of character string data stored in a storage unit;
    a second step of decomposing the ligature detected in the first step into multiple original letters on which the ligature is based;
    a third step of replacing a part of the ligature in each piece of character string data including the ligature with all of the multiple letters resulting from the decomposition or only a first letter of the multiple letters resulting from the decomposition;
    a fourth step of sorting the multiple pieces of character string data in a character code order, wherein the pieces of character string data after the replacement in the third step are used in the sorting instead of the pieces of character string data including the ligature; and
    a fifth step of displaying the multiple pieces of character string data in the list according to an order of the sorting in the fourth step.

9. The list display method according to claim 8,
    wherein the third step includes
        determining whether the part of the ligature is replaced with all of the multiple letters or only the first letter of the multiple letters depending on a type of the list to be displayed, to which the pieces of character string data including the ligature belong; and
        performing the replacement in accordance with a result of the determination.

10. The list display method according to claim 8,
    wherein the fifth step displays the pieces of character string data including the ligature in the list in a display mode in which the ligature is included.

* * * * *